United States Patent
Wilhelmsson

(10) Patent No.: US 10,929,960 B2
(45) Date of Patent: Feb. 23, 2021

(54) METHOD AND IMAGE PROCESSING DEVICE FOR DETECTING A PORTION OF AN IMAGE

(71) Applicant: Axis AB, Lund (SE)

(72) Inventor: Per Wilhelmsson, Lund (SE)

(73) Assignee: AXIS AB, Lund (SE)

( * ) Notice: Subject to any disclaimer, the term of this patent is extended or adjusted under 35 U.S.C. 154(b) by 355 days.

(21) Appl. No.: 16/105,423

(22) Filed: Aug. 20, 2018

(65) Prior Publication Data
US 2019/0057492 A1    Feb. 21, 2019

(30) Foreign Application Priority Data

Aug. 21, 2017  (EP) .................................. 17187050

(51) Int. Cl.
*G06T 5/00* (2006.01)
*G06T 5/20* (2006.01)
(Continued)

(52) U.S. Cl.
CPC .......... *G06T 5/003* (2013.01); *G06K 9/00503* (2013.01); *G06T 5/20* (2013.01); *G06T 7/00* (2013.01); *G06T 7/136* (2017.01); *G06T 7/80* (2017.01); *G06T 7/90* (2017.01); *G06T 5/50* (2013.01); *G06T 2207/10004* (2013.01); *G06T 2207/10016* (2013.01); *G06T 2207/10024* (2013.01); *G06T 2207/10048* (2013.01); *G06T 2207/20212* (2013.01); *G06T 2207/20221* (2013.01); *G06T 2207/30168* (2013.01); *G06T 2207/30232* (2013.01); *G06T 2207/30248* (2013.01); *H04N 5/232122* (2018.08)

(58) Field of Classification Search
CPC combination set(s) only.
See application file for complete search history.

(56) References Cited

U.S. PATENT DOCUMENTS 7,058,294 B2 * 6/2006 Nakahara ......... H04N 5/232123
                                                      396/104
8,200,022 B2 * 6/2012 Golan ................ G06K 9/00281
                                                      382/199
(Continued)

OTHER PUBLICATIONS

Elizabeth Allen et al: "Autofocus systems" In: "The Manual of Photography", Dec. 3, 2010 (Dec. 3, 2010), Taylor & Francis Group, XP055715947, ISBN: 978-0-08-092680-3 pp. 217-218.

(Continued)

*Primary Examiner* — Zhiyu Lu
(74) *Attorney, Agent, or Firm* — Xsensus LLP

(57) ABSTRACT

A method and an image processing device for detecting a portion of an image that is dominated by infrared (IR) light of at least one predetermined IR wavelength are disclosed. A set of phase pixel values for setting focus in the image is obtained. Each of the phase pixel values is compared to a first threshold related to phase shift occurring due to difference between at least a wavelength of the first colour component and said at least one predetermined IR wavelength. Moreover, in case a phase pixel value satisfies the first threshold, it is determined that the respective location associated with said phase pixel value is included in the portion of the image that is dominated by the IR light. A computer program and a computer program carrier are also disclosed.

13 Claims, 4 Drawing Sheets

(51) Int. Cl.
*G06T 7/90* (2017.01)
*G06T 7/80* (2017.01)
*G06T 7/00* (2017.01)
*G06K 9/00* (2006.01)
*G06T 7/136* (2017.01)
*H04N 5/232* (2006.01)
*G06T 5/50* (2006.01)

(56) References Cited

U.S. PATENT DOCUMENTS

| | | | | |
|---|---|---|---|---|
| 9,420,164 | B1* | 8/2016 | Galor Gluskin | ............................. H01L 27/14645 |
| 10,044,926 | B2* | 8/2018 | Galor Gluskin | .......... G06T 7/11 |
| 10,044,959 | B2* | 8/2018 | Galor Gluskin | ... H04N 9/04557 |
| 2007/0090149 | A1* | 4/2007 | Segura | ..................... B25C 1/008 227/142 |
| 2011/0304753 | A1* | 12/2011 | Shintani | ........... H04N 5/232123 348/279 |
| 2012/0026325 | A1 | 2/2012 | Bunker et al. | |
| 2012/0033120 | A1* | 2/2012 | Nakamura | ......... H04N 9/04557 348/302 |
| 2013/0002911 | A1* | 1/2013 | Miyashita | ........ H04N 5/232122 348/247 |
| 2014/0028806 | A1* | 1/2014 | Endo | ........................ G02B 7/34 348/49 |
| 2014/0125860 | A1* | 5/2014 | Tofsted | .................. G02B 26/00 348/349 |
| 2014/0267839 | A1* | 9/2014 | Nishimaki | ....... H04N 5/232122 348/246 |
| 2015/0055011 | A1* | 2/2015 | Aoki | .................. H04N 9/04557 348/353 |
| 2015/0062400 | A1* | 3/2015 | Kawai | ...................... G02B 7/34 348/302 |
| 2015/0373278 | A1* | 12/2015 | Hattori | ................... H04N 5/217 348/148 |
| 2017/0264811 | A1* | 9/2017 | Ollila | .................... H04N 5/3696 |
| 2019/0122355 | A1* | 4/2019 | Xu | ..................... G06K 9/00771 |

OTHER PUBLICATIONS

Elizabeth Allen: "Optical filters" In: "The Manual of Photography", Dec. 3, 2010 (Dec. 3, 2010), Taylor & Francis Group, XP055721344, ISBN: 978-0-08-092680-3 pp. 194-196.

Summons to Attend Oral Proceedings dated Aug. 24, 2020 in European Application No. 17 187 050.4.

Al Sheikh, S.S. et al., "Design and Implementation of an FTIR Camera-based Multi-Touch Display," GCC Conference & Exhibition, 2009 5th IEEE, IEEE, Mar. 17, 2009 (Mar. 17, 2009), pp. 1-6, XP031982956, DOI: 10.1109/IEEEGCC.2009.5734326, ISBN: 978-1-4244-3885-3, Sections III.A and III.B.5, pp. 1-6.

Extended European Search Report and Search Opinion for Application No. 17187050.4 dated Feb. 22, 2018.

\* cited by examiner

METHOD AND IMAGE PROCESSING DEVICE FOR DETECTING A PORTION OF AN IMAGE

CROSS-REFERENCE TO RELATED APPLICATIONS

This application claims priority to European Patent Application No. 17187050.4, filed Aug. 21, 2017, which is herein incorporated by reference in its entirety.

TECHNICAL FIELD

The embodiments herein relate to image processing. In particular, a method and image processing device for detecting a portion of an image that is dominated by infrared (IR) light of at least one predetermined IR wavelength are disclosed. A corresponding computer program and a computer program carrier are also disclosed.

BACKGROUND

Image processing refers to any processing that is applied to an image. The processing can include application of various effects, masks, filters or the like, to the image. In this manner, the image can be sharpened, converted to grey scale, or altered in some way. The image has typically been captured by a video camera, a still image camera or the like.

With reference to sharpening, some challenges arise when the scene to be captured includes both IR and visible light, since the image capturing device cannot be set to focus both IR and visible light onto its sensor at the same time due to chromatic aberrations. Hence, it has been proposed to capture such scene by separately focussing the visible light and the IR light onto the sensor of the image capturing device. This is typically achieved by activating and deactivating an IR-filter, for example by mechanically moving an IR-filter into or away from a path in which light from the scene passes on its way to the sensor. In this manner, two images of the same scene are obtained; one image without IR light and one image with IR light. Then, when processing these images, each of the two images is processed separately to find sharp areas, e.g. by comparing contrast in areas of the two images. The two images are subsequently blended back together, e.g. by picking areas of the one image which have higher contrast than corresponding areas of the other image, to form an image that is intended to include those areas of the two images that are sharper than the other. In certain scenarios, use of contrast to determine which areas to pick may not result in a sufficiently sharp image.

SUMMARY

An object may thus be how to determine which portions, or areas, of the image that needs sharpening.

According to an aspect, the object is achieved by a method for detecting a portion of an image that is dominated by IR light of at least one predetermined IR wavelength. A set of phase pixel values for setting focus in the image is obtained. The image is captured without an IR-filter. The focus of the image was set for a first colour component in a visible spectrum. Each phase pixel value of the set of phase pixel values is associated with a respective location in the image. A set of locations, comprising each respective location, is distributed over the image.

Furthermore, each of the phase pixel values is compared to a first threshold related to phase shift occurring due to difference between at least a wavelength of the first colour component and said at least one predetermined IR wavelength. Generally, a phase shift, being different from zero or outside some marginal range including zero, indicates that the respective location is not in focus. Thanks to that the first threshold is related to the phase shift occurring clue to difference between the wavelength of the first colour component and said at least one predetermined IR wavelength, it may for any phase pixel value that satisfies the first threshold be deduced that the respective location is dominated by the IR light.

Accordingly, in case a phase pixel value satisfies the first threshold, it is determined that the respective location associated with said phase pixel value is included in the portion of the image that is dominated by the IR light.

According to another aspect, the object is achieved by an image processing device configured to perform the above method.

According to further aspects, the object is achieved by a computer program and a computer program carrier corresponding to the aspects above.

In this manner, at least one portion, dominated by the IR light, is found quickly and easily by using phase pixels, which—according to prior art—are provided in order to enable autofocussing.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
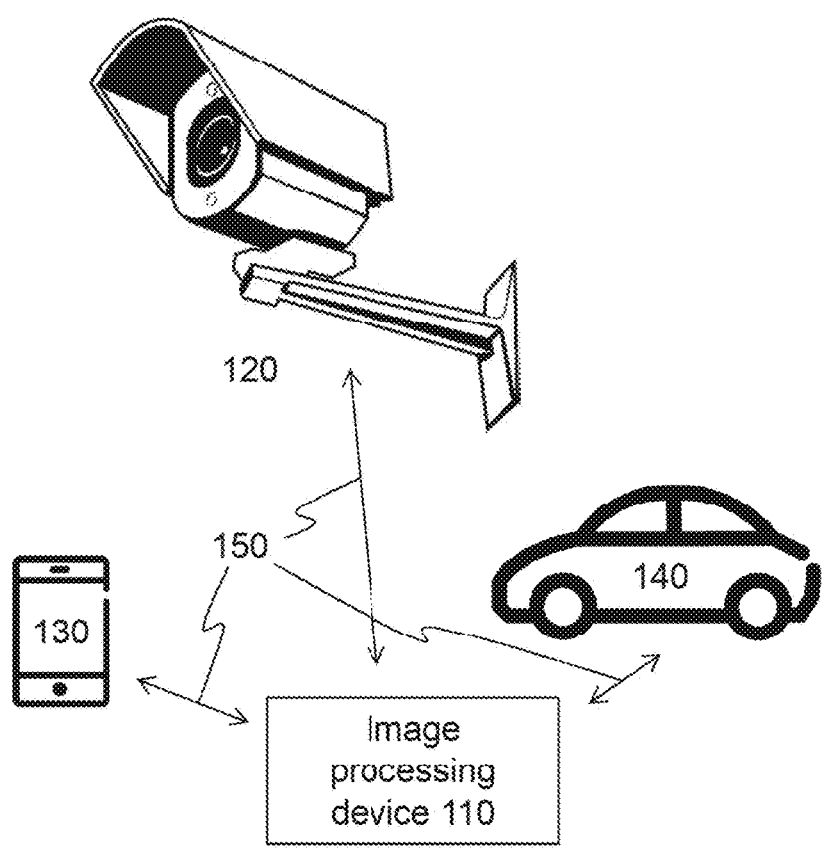
FIG. 1 is a schematic overview illustrating exemplifying embodiments herein.

Throughout the following description similar reference numerals have been used to denote similar features, such as devices, actions, modules, circuits, parts, items, elements, units or the like, when applicable. In the Figures, features that appear in some embodiments are indicated by dashed lines.

FIG. 1 depicts an exemplifying image processing device 110, such as a video recorder, a surveillance camera 120, a digital camera, a smartphone 130 including an image sensor, a car 140 including an image sensor, a wired or wireless device capable of obtaining images over a network or the like.

Thus, the image processing device 110 is capable of processing an image. The image may have been captured by the image processing device 110 itself or it may have been received from another device, which captured the image, or from a memory, such as hard drive or the like.

In order to better appreciate the following detailed description, some terms will be explained.

The term "phase pixel" may refer to a pixel equipped with a micro lens, which enables detection a phase shift which reflects focus or not focus for a particular wavelength. The phase shift may even reflect level or degree of out-of-focus, not only in focus or not in focus. In this manner, the phase shift output from the phase pixel can be used as input to known autofocussing procedures, e.g. a lens may be moved a distance corresponding to the phase shift in order to set the focus. When the phase shift is zero, or less than a margin close to zero, for the particular wavelength, light is focussed far the particular wavelength. Should light of a wavelength different from the particular wavelength be incident on the phase pixel, the phase shift will not be equal to zero, or greater than the margin. This means that phase shift is dependent upon a wavelength (or wavelengths) of light incident on the phase pixel. Phase pixels are known in the art and other examples than the one described above may be used.

When the image has been captured, data representing the image can be stored in any known existing or future format, such as Red Green Blue (RGB) or Cyan, Magenta, Yellow, and Key (CMYK), or the like. Typically, each pixel is represented by one or more colour components, or one or more colour channels. A colour component thus refers to one of RGB, one of CMYK or the like. Further known formats include, but are not limited to, Hue Saturation Luminance (HSL) Color Format, Luminance and Chrominance (YUV) Color Format etc.

Moreover, as used herein, the term "image" may refer to an image frame including information originating from an image sensor that has captured the image.

Furthermore, as used herein, the term "threshold" or "threshold value" may refer to a maximum value or a minimum value for a particular metric, such as intensity of a certain color component, a combination of color components or the like. When a value satisfies a threshold, the value may be greater than or less than the threshold depending of applicable criteria. Further, when the value satisfies the threshold, it may mean that the value is within a range that includes the threshold.

Figure 2:
FIG. 2 is an exemplifying picture having a blurred portion.

FIG. 2 illustrates an exemplifying image 200 captured from a scene including both IR light and visible light. Focus has been set for the visible light. Typically, a particular color component of the visible light, such as R, G or B, has been considered when setting the focus.

Due to that the focus was set for visible light, a portion 201 of the image 200, which includes IR light as well as visible light, is blurry. The IR light may normally have a wavelength of 850 nanometer (nm) or 940 nm due to availability of IR light sources, i.e. a first and a second predetermined wavelength, respectively.

In this example, most objects of the scene may be located at the same, or substantially the same, distance from an image sensor (not shown) that captured the image 200. The objects include people, buildings, street surfaces and the like. It may also be noted that the same, or substantially the same, distance may imply a margin of +/−5%, +/−10%, +/−20% or other suitable value depending on implementation and design considerations.

Figure 3:
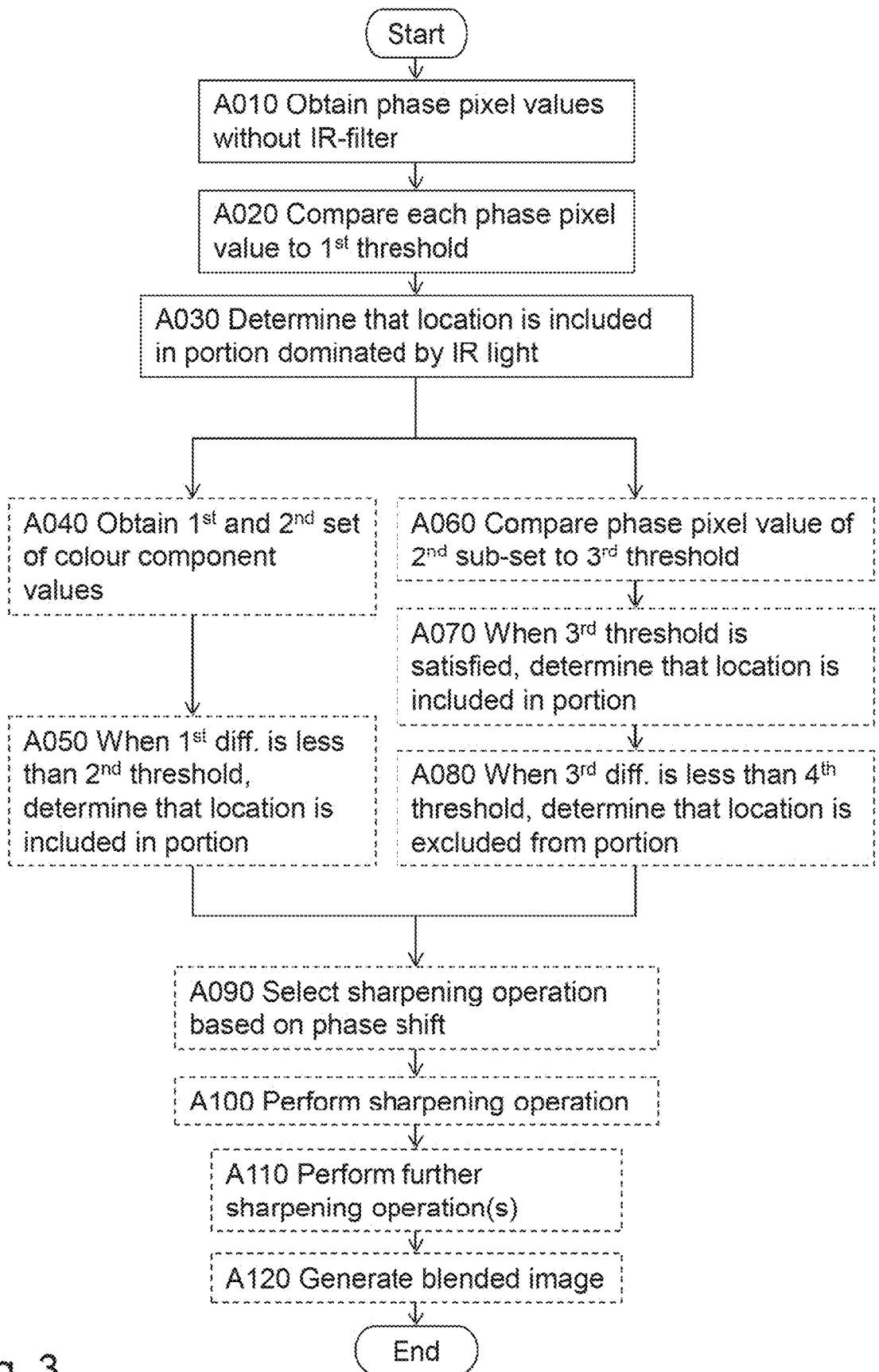
FIG. 3 is a flowchart illustrating embodiments of the method in an image processing device.

Now turning to FIG. 3, exemplifying methods according to embodiments herein are shown. The methods are implemented in the image processing device 110 of FIG. 1. The image processing device 110 thus generally performs a method for detecting the portion 201 of the image 200 that is dominated by IR light of at least one predetermined IR wavelength, such as one of 850 nm and 940 nm as mentioned above.

One or more of the following actions may be performed in the following exemplifying order, in other examples, the order may differ from what is described below.

Action A010

In order to be able to use information from phase pixels in the subsequent action(s), the image processing device 110 obtains a set of phase pixel values for setting focus in the image 200. The image processing device 110 may obtain the set of phase pixel values by receiving the phase pixel values from an image sensor or by receiving the phase pixel value from a memory, such as an internal memory, an external memory, a hard drive or the like. In some examples, this means that the image processing device 110 may be included in a computer system, such as a cloud server or the like.

The image 200 is, or has been, captured without an IR-filter. The focus of the image 200 was set for a first colour component in a visible spectrum. Each phase pixel value of the set of phase pixel values is associated with a respective location in the image 200. A set of locations, comprising each respective location, is distributed over the image 200.

It may here be mentioned that the set of phase pixel values for setting focus in the image 200 may refer to that the set of phase pixel values may be used for setting autofocus according to prior art. According to the embodiments herein, the set of phase pixel values are instead used for finding the portion 201 of the image 200 that is dominated by IR light as will be described in the following.

Action A020

The image processing device 110 compares each of the phase pixel values to a first threshold related to phase shift occurring due to difference between at least a wavelength of the first colour component and said at least one predetermined IR wavelength.

In this manner, the respective location of each of the phase pixels is identified as 1) being dominated by the IR light for any phase pixel value that satisfies the first threshold or as 2) not dominated by the IR light for any phase pixel value that fails to satisfy the first threshold.

Any phase shift value that is significant, i.e. different from zero and with an absolute value that is greater than a margin value for filtering away insignificant value, may indicate that the respective location of each of the phase pixels may be identified as being out of focus. Among the phase shift values that are significant the comparison to the first threshold facilitates in thresholding out, or filtering out, those phase shift values that are caused by IR light of said at least one predetermined IR wavelength.

Action A030

Hence, in case a phase pixel value satisfies the first threshold, the image processing device 110 determines that the respective location associated with said phase pixel value is included in the portion of the image that is dominated by the IR light.

When the phase shift value satisfies the first threshold, it may mean that the phase pixel value is within a first range that includes the first threshold. In this manner, it can be ensured that the phase shift value has occurred due to IR light originating any one of the known IR sources, having said at least one predetermined IR wavelength. A length, or a size, of the first range may e.g. be determined while taking a full width at half maximum of a spectrum for at least one of the known IR sources. In order to recognize two common IR sources, it may be that the first range includes a first sub-range and a second sub-range, each sub-range representing a respective one of the two common IR sources.

In some examples, the image processing device 110 may find that the portion includes all locations for which the associated phase pixel value satisfies the first threshold value.

Figure 4A:
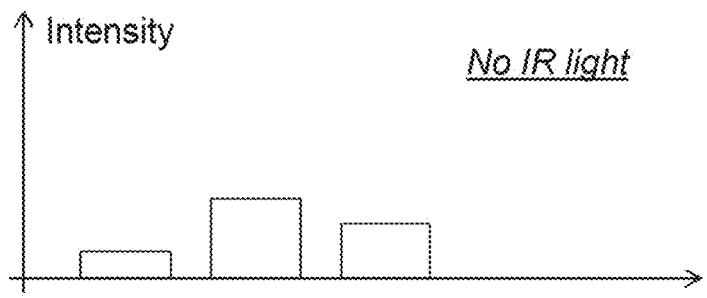
FIGS. 4a and 4b are diagrams illustrating intensity for different pixels.
Figure 4B:
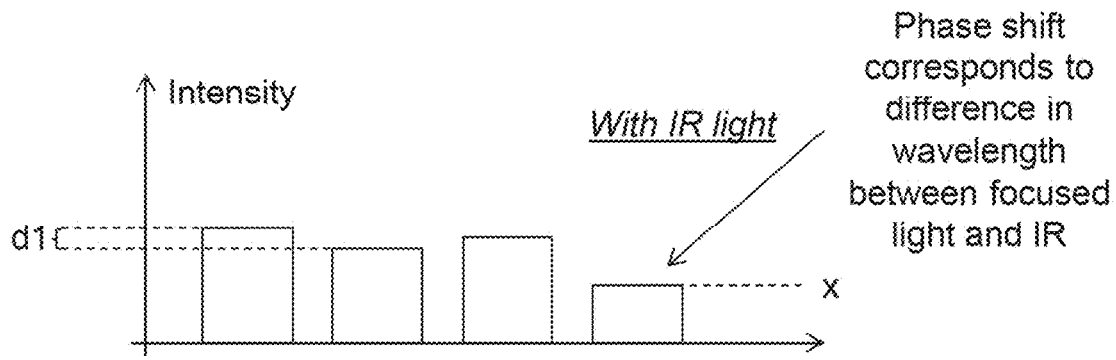

According to some first embodiments, actions A040-A050 may be performed. According to the first embodiments, the set of phase pixel values and RGB colour information obtained for at least two colour components, associated with pixels at the set of locations, are used to further limit which locations are included in the portion 201. Said at least two colour components may typically be different from the aforementioned first colour component. In some examples of the first embodiments, the set of phase pixel values may be captured without a colour filter. FIGS. 4a and 4b further illustrate how intensity for different pixels may aid in finding the portion 201 according to the first embodiments.

Action A040

The image processing device 110 may obtain a first set of colour component values of the image and a second set of colour component values of the image 200. The first and second sets of colour components are associated with the set of locations. The above mentioned RGB colour information obtained for said at least two colour components is thus exemplified by the first and second sets of colour component values, which may originate from pixels, i.e. common or standard pixels. The common or standard pixels are distinguished from phase pixels.

The first set of colour component values may be associated with a second colour component that is different from the first colour component. The second set of colour component values may be associated with a third colour component that also is different from the first colour component. Additionally, the second colour component may be different from the third colour component. As an example, the second colour component may be R and the third colour component may be B, while the first colour component may be G.

Action A050

The image processing device 110 may determine that the respective location is included in the portion 201 of the image 200, when a first difference between a respective one of the first set of colour component values, associated with the respective location, and a respective one of the second set of colour component values, associated with the respective location, is less than a second threshold for indicating that the respective one of the first set of colour component values and the respective one of the second set of colour component values are similar. The second threshold may in this fashion provide a condition for when the respective ones of first and second sets colour component values are considered to be similar.

As a result, this may mean that the respective location may only be included in the portion 201 of the image 200 1) when a phase shift is detected according action A030 and 2) when the respective one of the first set of colour component values and the respective one of the second set of colour component values are similar, e.g. all colour components are similar.

In this manner, it is confirmed that the phase shift may actually have been caused by the IR light and not due to that any object in the scene is located at a distance that arbitrarily would cause phase shift values that satisfies the first threshold.

A reason may be that it is expected that when IR light is dominating, common pixels may also receive at least some IR light, which may cause saturation. When saturation occurs, the first and second set of colour component values may be similar as described above. It may also, or alternatively, be that the IR light causes the red part of the spectrum to dominate, while the red part of the spectrum is close to IR light. As an example, action A050 may possibly be replaced by an action of determining that the first set of colour component values, e.g. representing a red colour component, dominates over, such as is greater than, the second set of colour component values, e.g. representing a green colour component or a blue colour component.

According to some second embodiments, actions A060-A070 and/or action A080 may be performed. With the second embodiments, the set of phase pixel values may comprise a first sub-set of phase pixel values, associated with the first colour component of the image 200. As mentioned, the focus of the image may have been set for the first colour component. The first sub-set of phase pixel values is associated with the set of locations. The first sub-set may thus be associated with the first colour component in that a colour filter matching the first colour component is applied to the phase pixels of the first sub-set. Moreover, the set of phase pixel values may further comprise a second sub-set of phase pixel values, associated with a second colour component of the image 200. The second sub-set may thus be associated with the second colour component in that a colour filter matching the second colour component is applied to the phase pixels of the second sub-set. The focus of the image 200 has not been set for the second colour component. The second sub-set of phase pixel values is associated with the set of locations. The first and second colour components may be different from each other.

Figure 5A:
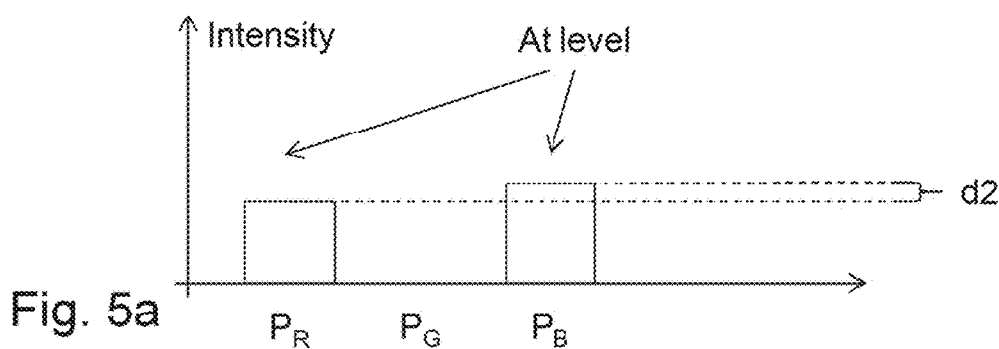
FIGS. 5a and 5b are further diagrams illustrating intensity for different pixels.
Figure 5B:
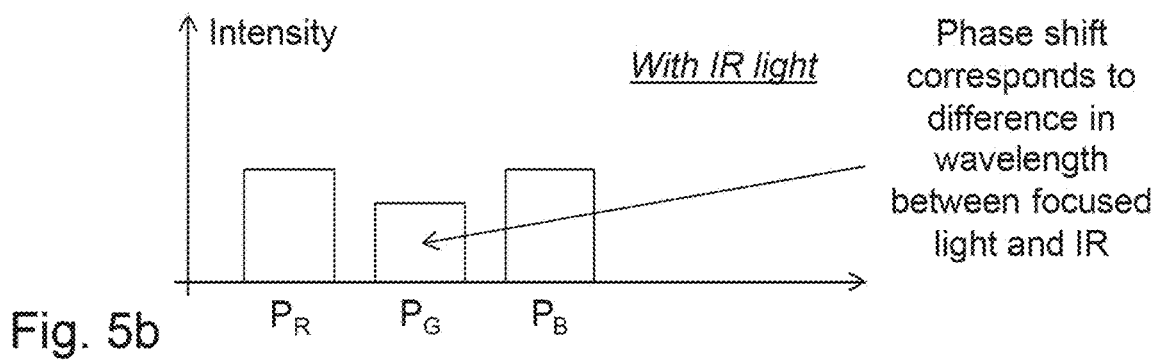

In the second embodiments, the phase pixels, e.g. the phase pixel of the first and second sub-sets, may be provided with colour filters. Hence, in order to find the portion 201, the second embodiments take advantage of knowledge about the phase pixels placement according to a Colour Filter Array (CFA), such as a Bayer filter or the like, in order to further limit which locations are included in the portion 201. The CFA provides information about which colour component that is associated with which phase pixel. FIGS. 5a and 5b illustrate in more detail how intensity for different pixels may aid in verifying that the portion 201 indeed includes locations dominated by IR light.

Action A060

The image processing device 110 may compare a phase pixel value of the second sub-set, associated with the respective location, to a third threshold related to phase shift occurring due to difference between wavelengths associated with the first and second colour components and said at least one predetermined IR wavelength.

With the second embodiments, the phase pixels value of the second sub-set may occur due to that IR light is included and that there is a difference between wavelengths of the first and second colour components. Therefore, this action verifies—by use of information from further phase pixels—that the respective location may indeed be included in the portion 201, when the third threshold is satisfied.

Action A060 may, hence, put further restrictions to action A020 above. For example, it may be that action A020 may be restricted to operate only on each phase pixel of the first sub-set. As mentioned, the first sub-set may then be associated with the first colour component and/or the second sub-set may be associated with the second colour component. Furthermore, the first threshold of action A020 may be limited to only relate to phase shift occurring due to difference between the wavelength of the first colour component and said at least one predetermined IR wavelength.

Action A070

The image processing device 110 may determine that the respective location associated with said phase pixel value of the second sub-set is included in the portion 201 of the image, when the phase pixel value of the second sub-set satisfies the third threshold.

It may now have been confirmed by both action A030 and A070 that the phase shift appears to occur due to dominating IR light.

Action A070 may in this fashion put further restrictions to action A030 above.

Action A080

The set of phase pixel values may further comprise a third sub-set of phase pixel values, associated with a third colour component of the image. The third sub-set of phase pixel values is associated with the set of locations. The third sub-set of phase pixels may also be provided with a colour filer, different from the colour filters of the first and second sub-sets of phase pixels. The third sub-set may thus be associated with the third colour component in that a colour filter matching the third colour component is applied to the phase pixels of the third sub-set.

This action may be performed when a phase pixel of the first sub-set of phase is zero, or almost zero. It may then, as mentioned before, be concluded that the respective location is in focus. Such conclusion may be verified as follows.

When a third difference between the phase pixel value of the second sub-set and a phase pixel value of the third sub-set, associated with the respective location, is less than a fourth threshold for indicating that the phase pixel values of the second and third sub-sets are similar, the image processing device 110 may determine that the respective location is excluded from the portion 201 of the image 200. That is to say, the respective location is considered to be in focus and to mainly include visible light.

Should it be that the respective location is dominated by IR light, it is expected that the phase pixel values of the second and third sub-sets are different from each other due to that spectra for the second and third colour components are different. Thus, different amount of IR light would escape into the phase pixels of the second and third sub-sets.

Thanks to this action, it may in fact be that the respective location, which initially appeared to be in focus due to visible light, may be susceptible for improvement when it is found that the respective location is dominated by IR light, i.e. when the third difference is greater than the fourth threshold. This may happen when an IR illuminated object of the scene accidentally is placed at a distance for which IR light becomes in focus at the image. Any contribution to the phase shift for the first colour component may in this case also be negligible by chance.

This action may be performed before or after action A060 and/or action A070.

When action A080 is performed after action A060, action A080 may revise the determining of action A060 such that the respective location is excluded from the portion 201.

When action A080 is performed before action A060 and/or action A070, the determining of action A060 may not need to be performed when the respective location is excluded from the portion 201.

Action A090

The image processing device 110 may select a sharpening operation based on a phase shift derived from phase pixel values associated with the portion 201 of the image.

A direction of the phase shift and an amount of the phase shift provide information about how much the respective location is out of focus. The direction refers to whether the phase shift is positive or negative and the amount refers to a value of the phase shift. Based on the phase shift, it can thus be calculated what the pixel value(s) should be if it was in focus. In this example, it may be assumed that the object at the respective location is at the same, or substantially the same, distance from the sensor as the object at which focus was set.

Accordingly, the sharpening operation to be selected may in some cases be that the sharpening operation is adjusted to take into account the direction and the amount of the phase shift such that the portion's pixels are set as if they were in focus.

Action A100

The image processing device 110 may perform the sharpening operation at the portion 201 of the image.

Action A110

The image processing device 110 may perform one or more additional sharpening operations at one or more further portions of the image not being dominated by the IR light. This action may be performed as optional sharpening operations not related to that portions dominated by IR light may be out of focus. In some cases, it may thus be that some or all of said one or more further portions are not sharpened at all.

Action A120

The image processing device 110 may generate a blended image by blending at least the portion of the image with said one or more further portions of the image, where said one or more further portion may or may not be sharpened according to action A110.

In further examples, the first and second embodiments may be combined. An advantage may then be that:

a) for any phase pixel with a significant value, it may be verified whether or not it occurs due to domination of IR light, and b) for any phase pixel with an insignificant value, i.e. used when setting focus, it may be verified whether or not it is insignificant due to visible light or not.

Briefly, in one example, information from phase pixels, e.g. focus pixels for autofocus, placed over the entire sensor may be used to find the portion 201 of the image 200 that is dominated by the IR light. If there is phase shift and e.g. all the colour channels are similar (or in the red part of the spectrum), it is likely that this portion 201 of the image 200 is an image area with dominating IR light content. Separating the portions with visual light content from the IR light content may make it possible to perform different or local sharpening in the different areas so that the entire image can be sharp. The information from the phase pixels may further be used to calculate the sharpening operations needed.

Now, in more detail with reference to FIG. 4*a* and FIG. 4*b*, it is described how the phase shift is used to identify the blurred, or out-of-focus, portion 201.

FIG. 4*a* and FIG. 4*b* are column charts, in which intensity is plotted for three pixels associated with a respective colour component R, G, B and one or more phase pixels P, referred to as a phase pixel P. With reference to the phase pixel P, it may be noted that the intensity represents the phase shift detected at the phase pixel P. The image 200 has been captured without IR light. As mentioned before, the focus of the image 200 was set for the first colour component in the visible spectrum. The first colour component is in this example one of R, G and B. With no IR light, the phase pixel will thus not yield any value, or a negligible value.

According to action A010, the image 200 was captured without an IR-filter as shown in FIG. 4*b*. Therefore, the phase pixel P yields a value x, e.g. when the scene includes IR light. The value x of the phase pixel, i.e. phase shift, corresponds to a difference in wavelength between the colour components) for which focus was set and IR light, i.e. light of said at least one predetermined IR wavelength. As an example, a green colour component G has been used when setting the focus. Consequently, any green light, associated with the green colour component G, incident upon the phase pixel P will not contribute to the value x.

Hence, if there is a phase shift, i.e. the value x is different from zero and satisfies the first threshold, it may according to the first embodiments also be that it is checked whether or not colour component values for a red and a blue colour component are similar. See also action A050. The colour component values are considered to be similar if a difference d1 between them is less than the second threshold.

As an example, the difference d1 between colour components R and G is less than the second threshold. It is then determined that the respective location is include in the portion 201 of the image 200 that is dominated by the IR light. This may be an indication of that the portion 201 is dominated by the IR light since the colour components R and G may also include some amount of IR light. This amount of IR light may thus have passed through respective colour filter corresponding to the colour components R and G. Possibly, the IR light incident on the colour components R, G, B may cause saturation, which would render the colour components similar. In case all components are not saturated, it may be that the colour component R is dominating, since it is expected that a red filter, corresponding to the colour component R, allows more IR to pass than e.g. the respective colour filter corresponding to the colour component G.

In one example of the first embodiments, some of the following actions may be performed:

When IR-filter is removed, use phase pixels to identify if parts of the image are out of focus and threshold the out of phase value to see if they correspond to known IR sources (850 or 940 nm).

Verify if IR or visible light is in focus using color channel information (after demosaicing) plus direction of phase shift.

Create a blended image between visible light and IR light image.

Sharpen unfocused image using any of ranges of known deconvolution technics.

Blend back the images to create a black and white multi-spectrum sharp image.

Furthermore, FIG. 5a and FIG. 5b illustrate in more detail how the phase shift is used to identify the blurred, or out-of-focus, portion 201. FIG. 5a and FIG. 5b are column charts, in which intensity, i.e. phase shift value, is plotted for three phase pixels provided with colour filters according to a CFA. Thus, each of the three phase pixels is associated with a respective colour component, e.g. one of R, G and B.

As shown in FIG. 5a, according action A080 of the second embodiments, it may be confirmed whether or not the image includes IR light. The phase pixel $P_G$, corresponding to the colour component G for which focus was set, provides no value. However, the other two phase pixels $P_R$ and $P_B$ provide a first value and a second value, respectively. The first and second values are expected to be similar, such as in absolute terms, i.e. the third difference, e.g. between the first and second values, is less than the fourth threshold as in action A080, when the image includes no IR light. A reason may be that difference in wavelength between $P_R$ and $P_G$ is about the same as difference in wavelength between $P_G$ and $P_B$. Hence, phase shift occurring due to difference in wavelength may also be expected to be similar. Therefore, when the first and second values are similar, or at level, it is determined that there is no IR light and the respective location may excluded from the portion 201 that is considered to be dominated by IR light. Should it be that the image includes IR light, it is expected that the first and second values differ from each other more significantly for example due to that filters for the two phase pixels $P_R$ and $P_B$ have different spectra, in particular with regard to IR light.

FIG. 5b, illustrates cases when the phase pixel $P_G$ has an unneglectable value and further actions, such as action A060 and A070, may be performed. With these actions, it is confirmed that the phase shift indicated by e.g. $P_G$ is also indicated by at least one of $P_R$ and $P_B$. While there may be a natural difference between the phase pixel $P_R$ and the phase pixel $P_G$ due to chromatic aberration, the third threshold may have been adjusted accordingly as compared to the first threshold to compensate for such natural difference.

In one example of the second embodiments, some of the following actions may be performed:

When IR-filter is removed use phase pixels on green color to verify focus and verify phase shift distance at level for red and blue on either direction, then the area is determined to be visible light and in focus.

Use phase pixels to identify if parts of the image are out of focus and threshold the out of phase value to see if corresponds to known IR sources (850 or 940 nm).

Verify if it is IR or visible light using color channel information (after demosaicing) plus direction of phase shift.

Create a blended image between visible light and IR light image.

Sharpen unfocused image using any of ranges of deconvolution technics.

Blend back the images to create a black and white multi-spectrum sharp image.

Figure 6:
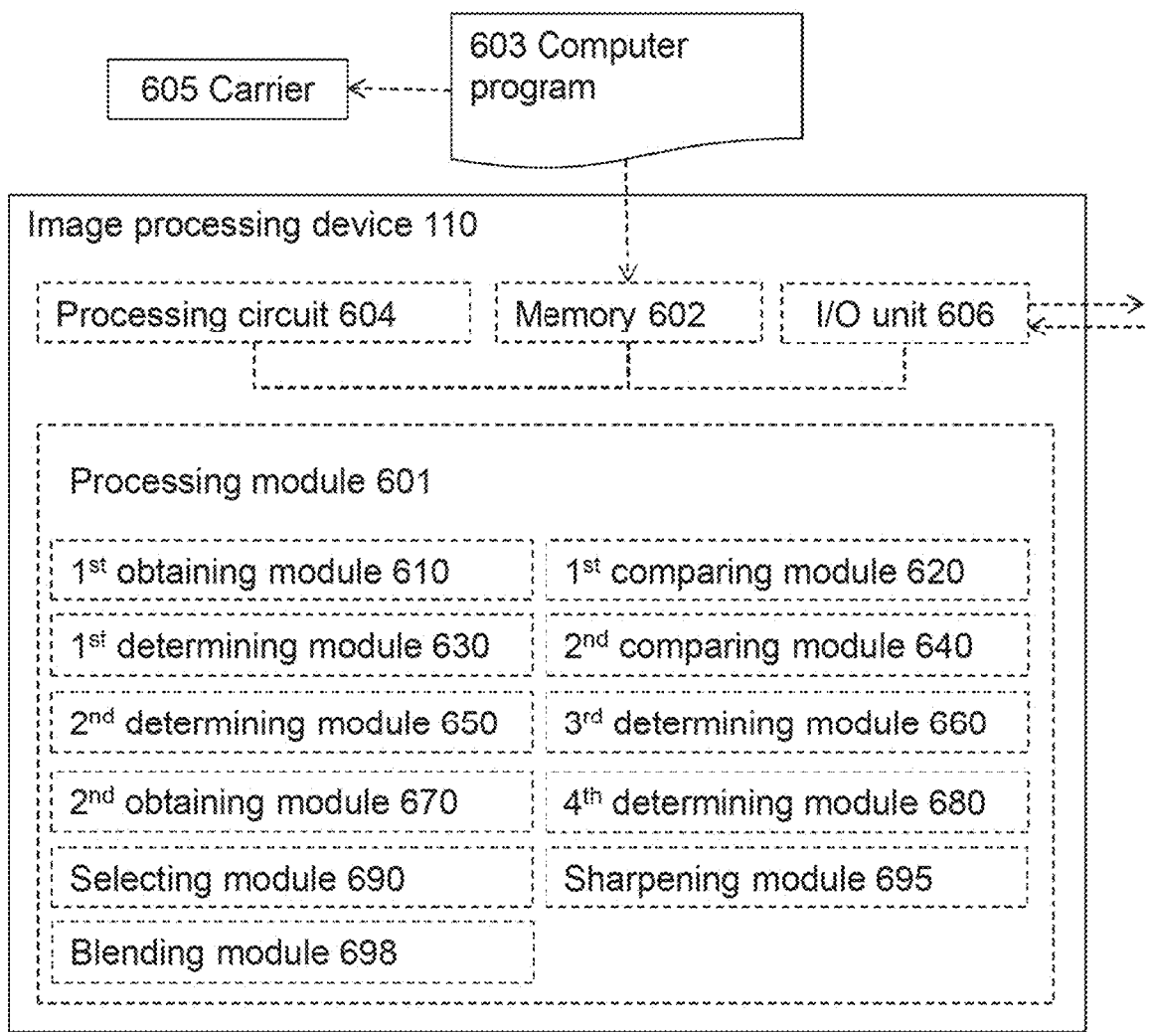
FIG. 6 is a block diagram illustrating embodiments of the image processing device.

With reference to FIG. 6, a schematic block diagram of embodiments of the image processing device 110 of FIG. 1 is shown.

The image processing device 110 may comprise a processing module 601, such as a means for performing the methods described herein. The means may be embodied in the form of one or more hardware modules and/or one or more software modules The image processing device 110 may further comprise a memory 602. The memory may comprise, such as contain or store, instructions, e.g. in the form of a computer program 603, which may comprise computer readable code units.

According to some embodiments herein, the image processing device 110 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image processing device 110 is operative to perform the methods of FIG. 3. As another example, the instructions, when executed by the image processing device 110 and/or the processing circuit 604, may cause the image processing device 110 to perform the method according to FIG. 3.

In view of the above, in one example, there is provided an image processing device 110 for detecting a portion of an image that is dominated by IR light of at least one predetermined IR wavelength. Again, the memory 602 contains the instructions executable by said processing circuit 604 whereby the image processing device 110 is operative for performing the method according to FIG. 3:

obtaining a set of phase pixel values for setting focus in the image, wherein the image is captured without an IR-filter, wherein the focus of the image was set for a first colour component in a visible spectrum, wherein each phase pixel value of the set of phase pixel values is associated with a respective location in the image, wherein a set of locations, comprising each respective location, is distributed over the image, comparing each of the phase pixel values to a first threshold related to phase shift occurring due to difference between at least a wavelength of the first colour component and said at least one predetermined IR wavelength, and in case a phase pixel value satisfies the first threshold, determining that the respective location associated with said phase pixel value is included in the portion of the image that is dominated by the IR light.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the image processing device 110 and/or the processing module 601 may comprise one or more of a first obtaining module 610, a first comparing module 620, a first determining module 630, a second comparing module 640, a second determining module 650, a third determining module 660, a second obtaining module 670, a fourth determining module 680, and a selecting module 690, a sharpening module 695, and a blending module 698 as exemplifying hardware modules. In other examples, one or more of the aforementioned exemplifying hardware modules may be implemented as one or more software modules.

Moreover, the processing module 601 comprises an Input/Output unit 606. According to an embodiment, the Input/Output unit 606 may comprise an image sensor 606 configured for capturing the image 200. The image sensor 606 may include a plurality of phase pixels distributed over the image sensor 606. The image processing device 110 may be configured to allow the image sensor 606 to capture images with or without an IR-filter.

Accordingly, the image processing device 110 is configured for detecting a portion of an image that is dominated by Infrared IR light of at least one predetermined IR wavelength.

Therefore, according to the various embodiments described above, the image processing device 110 and/or the processing module 601 and/or the first obtaining module 610 is configured for obtaining a set of phase pixel values for setting focus in the image, wherein the image is captured without an IR-filter, wherein the focus of the image was set for a first colour component in a visible spectrum, wherein each phase pixel value of the set of phase pixel values is associated with a respective location in the image, wherein a set of locations, comprising each respective location, is distributed over the image.

The image processing device 110 and/or the processing module 601 and/or the first comparing module 620 is configured for comparing each of the phase pixel values to a first threshold related to phase shift occurring due to difference between at least a wavelength of the first colour component and said at least one predetermined IR wavelength.

The image processing device 110 and/or the processing module 601 and/or the first determining module 630 is configured for, in case a phase pixel value satisfies the first threshold, determining that the respective location associated with said phase pixel value is included in the portion of the image that is dominated by the IR light.

The image processing device 110 and/or the processing module 601 and/or the second comparing module 640 (or the first comparing module 620) may be configured for comparing a phase pixel value of the second sub-set, associated with the respective location, to a third threshold related to phase shift occurring due to difference between wavelengths associated with the first and second colour components and said at least one predetermined IR wavelength.

The image processing device 110 and/or the processing module 601 and/or the second determining module 650 (or the first determining module 630) may be configured for, when the phase pixel value of the second sub-set satisfies the third threshold, determining that the respective location associated with the phase pixel value of the second sub-set is included in the portion of the image.

The image processing device 110 and/or the processing module 601 and/or the third determining module 660 (or the first or second determining module 630, 650) may be configured for, when a third difference between the phase pixel value of the second sub-set and a phase pixel value of the third sub-set, associated with the respective location, is less than a fourth threshold for indicating that the phase pixel values of the second and third sub-sets are similar, determining that the respective location is excluded from the portion of the image.

The image processing device 110 and/or the processing module 601 and/or the second obtaining module 670 (or the first obtaining module 610) may be configured for obtaining a first set of colour component values of the image and a second set of colour component values of the image, wherein the first and second sets of colour components are associated with the set of locations.

The image processing device 110 and/or the processing module 601 and/or the fourth determining module 680 (or the first, second, third determining module 630, 650, 660) may be configured for, when a first difference between a respective one of the first set of colour component values, associated with the respective location, and a respective one of the second set of colour component values, associated with the respective location, is less than a second threshold for indicating that the respective one of the first set of colour component values and the respective one of the second set of colour component values are similar, determining that the respective location is included in the portion of the image The image processing device 110 and/or the processing module 601 and/or the selecting module 690 may be configured for selecting a sharpening operation based on a phase shift derived from phase pixel values associated with the portion of the image.

The image processing device 110 and/or the processing module 601 and/or the sharpening module 700 may be configured for performing the sharpening operation at the portion of the image; and/or performing one or more additional sharpening operations at one or more further portions of the image not being dominated by the IR light.

The image processing device 110 and/or the processing module 601 and/or the blending module 710 may be configured for generating a blended image by blending at least the portion of the image with said one or more further portions of the image.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shah be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for detecting a portion of an image that is dominated by Infrared (IR) light of at least one predetermined IR wavelength, the method comprising:
    obtaining a set of phase pixel values for setting focus in the image, wherein the image is captured without an IR-filter, wherein the focus of the image was set for a first colour component in a visible spectrum, wherein each phase pixel value of the set of phase pixel values is associated with a respective location in the image, wherein a set of locations, comprising each respective location, is distributed over the image,
    comparing each of the phase pixel values to a first threshold related to phase shift occurring due to difference between at least a wavelength of the first colour component and said at least one predetermined IR wavelength, and
    in case a phase pixel value is greater than the first threshold, determining that the respective location in the image associated with said phase pixel value is included in the portion of the image that is dominated by the IR light.

2. The method according to claim 1, wherein the method comprises:
    obtaining a first set of colour component values of the image and a second set of colour component values of the image, wherein the first and second sets of colour components are associated with the set of locations, and
    when a first difference between a respective one of the first set of colour component values, associated with the respective location, and a respective one of the second set of colour component values, associated with the respective location, is less than a second threshold for indicating that the respective one of the first set of colour component values and the respective one of the second set of colour component values are similar, determining that the respective location is included in the portion of the image.

3. The method according to claim 2, wherein the set of phase pixel values comprises a first sub-set of phase pixel values, associated with the first colour component, wherein the first sub-set of phase pixel values are associated with the set of locations, and/or wherein the set of phase pixel values comprises a second sub-set of phase pixel values, associated with a second colour component of the image, wherein the second sub-set of phase pixel values is associated with the set of locations.

4. The method according to claim 3, wherein the method comprises:

comparing a phase pixel value of the second sub-set, associated with the respective location, to a third threshold relating to phase shift occurring due to difference between wavelengths associated with the first and second colour components and said at least one predetermined IR wavelength, and when the phase pixel value of the second sub-set is greater than the third threshold, determining that the respective location associated with said phase pixel value of the second sub-set is included in the portion of the image.

5. The method according to claim 4, wherein the set of phase pixel values further comprises a third sub-set of phase pixel values, associated with a third colour component of the image, wherein the third sub-set of phase pixel values is associated with the set of locations, wherein the method comprises:

when a third difference between the phase pixel value of the second sub-set and a phase pixel value of the third sub-set, associated with the respective location, is less than a fourth threshold for indicating that the phase pixel values of the second and third sub-sets are similar, determining that the respective location is excluded from the portion of the image.

6. The method according to claim 2, wherein the method is performed by an image processing device configured to detect portions of an image dominated by IR light, wherein the image is captured by an image sensor, which includes a plurality of phase pixels distributed over the image sensor, wherein the image processing device is configured to allow the image sensor to capture images with or without an IR-filter.

7. The method according to claim 2, wherein the method comprises:

selecting a sharpening operation based on a phase shift derived from phase pixel values associated with the portion of the image.

8. The method according to claim 7, wherein the method comprises:

performing the sharpening operation at the portion of the image.

9. The method according to claim 8, wherein the method comprises:

performing one or more additional sharpening operations at one or more further portions of the image not being dominated by the IR light.

10. The method according to claim 9, wherein the sharpening operation and/or said one or more additional sharpening operations uses one or more deconvolution techniques.

11. The method according to claim 9, wherein the method comprises:

generating a blended image by blending at least the portion of the image with said one or more further portions of the image.

12. An image processing device configured to perform the method according to claim 1.

13. A non-transitory computer storage medium, comprising computer readable code units which when executed on an image processing device causes the image processing device to perform the method according to claim 1.

* * * * *